L. SEGUIN.
DASHBOARD FOR MOTOR VEHICLES.
APPLICATION FILED MAR. 5, 1920.
1,353,427.
Patented Sept. 21, 1920.
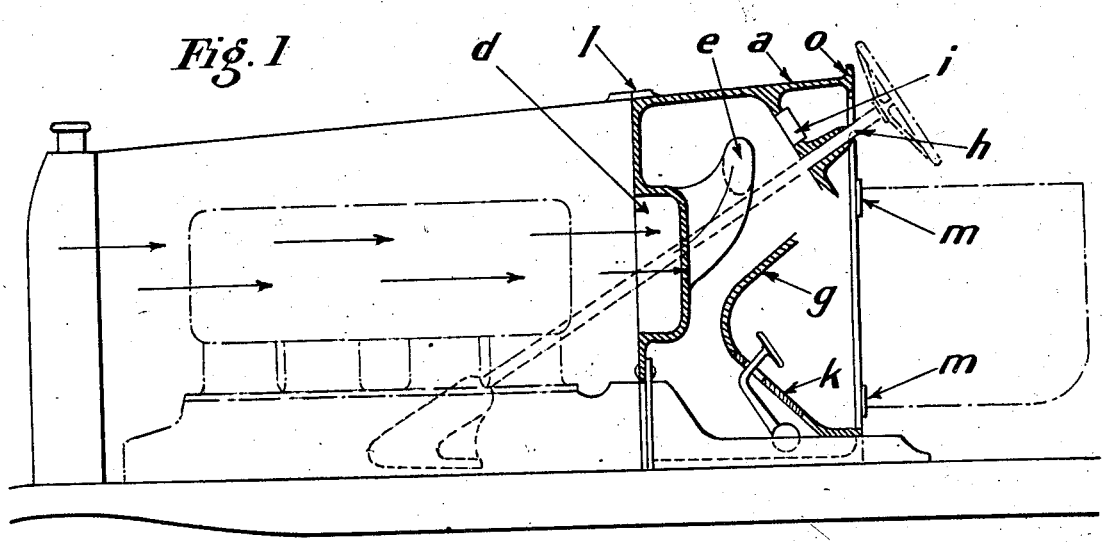
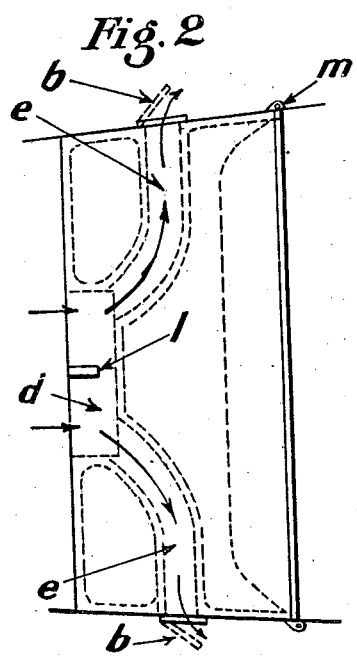
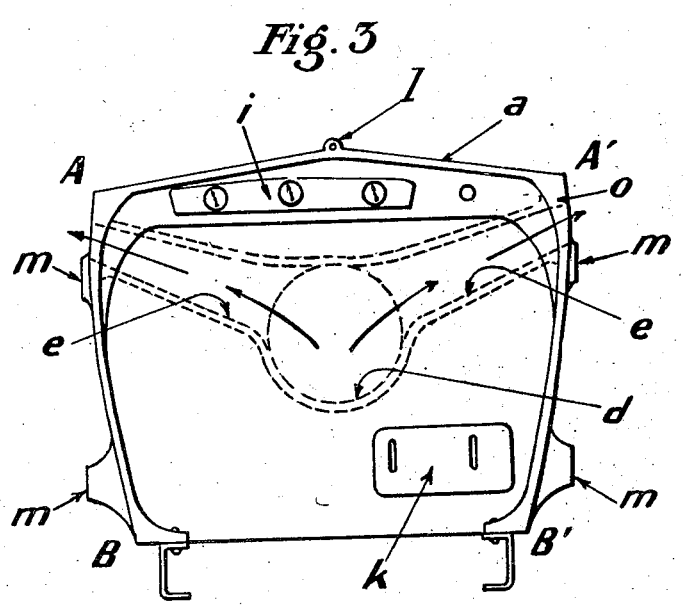
INVENTOR:
Laurent Seguin
BY Wm Wallace White
ATT'Y.

UNITED STATES PATENT OFFICE.

LAURENT SEGUIN, OF PARIS, FRANCE, ASSIGNOR TO SOCIETE DES MOTEURS GNOME ET RHONE, OF PARIS, FRANCE.

DASHBOARD FOR MOTOR-VEHICLES.

1,353,427.

Specification of Letters Patent. Patented Sept. 21, 1920.

Application filed March 5, 1920. Serial No. 363,603.

*To all whom it may concern:*

Be it known that I, LAURENT SEGUIN, citizen of the Republic of France, residing at 41 Rue La Boëtie, Paris, in the Republic of France, have invented new and useful Improvements in Dashboards for Motor-Vehicles, of which the following is a specification.

This invention relates to a dash-board for motor vehicles permitting to connect the chassis to the carriage body in a more convenient and satisfactory manner than heretofore, and to improve the comfort of the passengers by removing wholly or partly the hot air coming from the engine.

In the accompanying drawing, given by way of example:

Figure 1 is a fragmentary side view of the front part of a motor vehicle showing in section the dash-board constructed in accordance with the invention.

Fig. 2 is a plan view of the dash-board.

Fig. 3 is a transverse view of the dash-board as seen from the rear.

In the drawing, $a$ indicates the dash-board which may be constituted by a casting preferably of aluminium or by a sheet metal stamped member, said casting or member being secured to the chassis by means of rivets. The dashboard $a$ conforms externally to the shape of the sides of the carriage body A B, A' B' (Fig. 3). Said dash-board comprises at the front a full wall, the center part of which is depressed rearwardly so as to provide a chamber $d$ communicating with the outside of the vehicle by means of lateral conduits $e$ provided at each end with a small hinged door $b$ which may be arranged so as to be operable from the driver's seat.

It will be readily understood that the hot air coming from the engine is obliged to flow in the direction of the arrows through the conduits $e$ and is thus driven to the outside which removes the heat to which the passengers seated at the front in modern vehicles are often unpleasantly submitted. The adjustable opening of the doors permits to regulate this ventilation.

The dash-board $a$ is provided at the rear with a suitably shaped wall $g$ having a hole $h$ for the passage of the steering tube and a dismountable plate $i$ carrying the accessories such as a pressure gage, a voltmeter, etc. To permit the passage of the pedals and secure an easy access to the various mechanical members, the dash-board is provided with another dismountable plate $k$. The dash-board carries also, preferably formed integrally therewith, the hinges $l$ for the hood, the hinges $m$ for the doors of the vehicle and an angle member O in which holes are provided for fastening directly said dash-board to the carriage body.

Having now described my invention, what I claim as new and desire to secure by Letters Patent is:

1. A dash-board constituted by a casing having a front wall, a rear wall, a top wall and two side walls, said casing conforming externally to the outer shape of the carriage body, the front wall being depressed rearwardly in its center portion to form a chamber open at the front and conduits in said casing to provide a communication between said chamber and the outside of the vehicle, said conduits opening laterally through said side walls.

2. A dash-board constituted by a casing having a front wall, a rear wall, a top wall and two side walls, said casing conforming externally to the outer shape of the carriage body, the front wall being depressed rearwardly in its center portion to form a chamber open at the front and conduits in said casing to provide a communication between said chamber and the outside of the vehicle, said conduits opening laterally through said side walls, and doors adapted to close adjustably the outside ends of said conduits.

3. A dash-board constituted by a casing comprising a front wall, a rear wall, a top wall and two side walls, said casing conforming externally to the outer shape of the carriage body, the front wall being depressed rearwardly in its center portion to form a chamber open at the front and conduits in said casing to provide a communication between said chamber and the outside of the vehicle, said conduits opening laterally through said side walls, means to secure said dash-board to the chassis, means to secure the carriage body to the dash-board, means to hinge the engine hood members and carriage doors thereto, a dismountably mounted plate in an opening in said rear wall, said plate being adapted to carry indicating instruments such as voltmeter, manometer, etc., a dismountably mounted plate in another opening in said rear wall for inserting the pedals and affording access to the inside of the casing.

4. A dash-board constituted by a casing comprising a front wall, a rear wall, a top wall and two side walls, said casing conforming externally to the outer shape of the carriage body, the front wall being depressed rearwardly in its center portion to form a chamber open at the front and conduits in said casing to provide a communication between said chamber and the outside of the vehicle, said conduits opening laterally through said side walls, means to secure said dash-board to the chassis, means to secure the carriage body to the dash-board, means to hinge the engine hood members and carriage doors thereto, a dismountably mounted plate in an opening in said rear wall, said plate being adapted to carry indicating instruments such as voltmeter, manometer, etc., a dismountably mounted plate in another opening in said rear wall for inserting the pedals and affording access to the inside of the casing and doors adapted to close adjustably the outside ends of said conduits.

In testimony whereof I have signed my name to this specification.

LAURENT SEGUIN.